United States Patent [19]
Ziemek

[11] 3,941,296
[45] Mar. 2, 1976

[54] PROCESS FOR MANUFACTURING FLEXIBLE TUBING CAPABLE OF WITHSTANDING SUBSTANTIAL PRESSURES AND FLEXIBLE METAL TUBING MADE THEREBY

[75] Inventor: Gerhard Ziemek, Langenhagen, Germany

[73] Assignee: Kabel-und Metallwerke Gutehoffnungshutte Aktiengesellschaft, Germany

[22] Filed: June 3, 1974

[21] Appl. No.: 475,642

[30] Foreign Application Priority Data
June 22, 1973 Germany............................ 2331757

[52] U.S. Cl. .............................................. 228/148
[51] Int. Cl.² .................. H01B 13/00; B23K 31/02
[58] Field of Search............ 29/474.1, 473.9, 473.3; 228/148

[56] References Cited
UNITED STATES PATENTS

| | | | |
|---|---|---|---|
| 1,685,269 | 9/1928 | Bundy | 29/474.1 |
| 1,866,145 | 7/1932 | Wilson | 29/473.3 |
| 2,234,450 | 3/1941 | Quarnstrom | 29/473.9 |
| 2,255,472 | 9/1941 | Quarnstrom | 29/474.1 |
| 3,091,848 | 6/1963 | Frank | 29/474.1 |
| 3,183,300 | 5/1965 | Jachimowicz | 29/474.1 |
| 3,405,228 | 10/1968 | Polizzano | 29/474.1 |
| 3,639,970 | 2/1972 | Larkin | 29/474.1 |
| 3,703,034 | 11/1972 | Eilhardt | 29/474.1 |

*Primary Examiner*—Al Lawrence Smith
*Assistant Examiner*—Robert C. Watson
*Attorney, Agent, or Firm*—Marn & Jangarathis

[57] ABSTRACT

In accordance with the teachings of the instant invention, techniques for the manufacture of flexible metal tubing and metal tubing made thereby are set forth wherein a plurality of thin walled metal tubes are concentrically formed one about the other and subsequently corrugated to form continuous lengths of flexible metal tubing capable of withstanding substantial pressures. This is achieved in accordance with the teachings of the instant invention by forming an inner component tube from the continuous forming in a lengthwise direction of a metal band into a tube having longitudinal edges which are welded together to form a continuous, longitudinal welded joint. Concurrently, at least one further component tube is formed concentrically about the inner tube by a lengthwise deformation of a second metal band into a second tube having opposed longitudinal edges in close proximity to each other. This second tube is also welded in a longitudinal direction and immediately thereafter, is reduced in diameter through drawing techniques to an appropriate dimensional relationship with the inner tube initially being formed. The resulting structure is subsequently corrugated in the same manner as a single wall structure is corrugated and it has been found that the resulting structural configuration is highly flexible, unexpectedly simple to corrugate and is capable of withstanding pressures equal to or greater than a single thick walled tube designed for a similar purpose.

14 Claims, 4 Drawing Figures

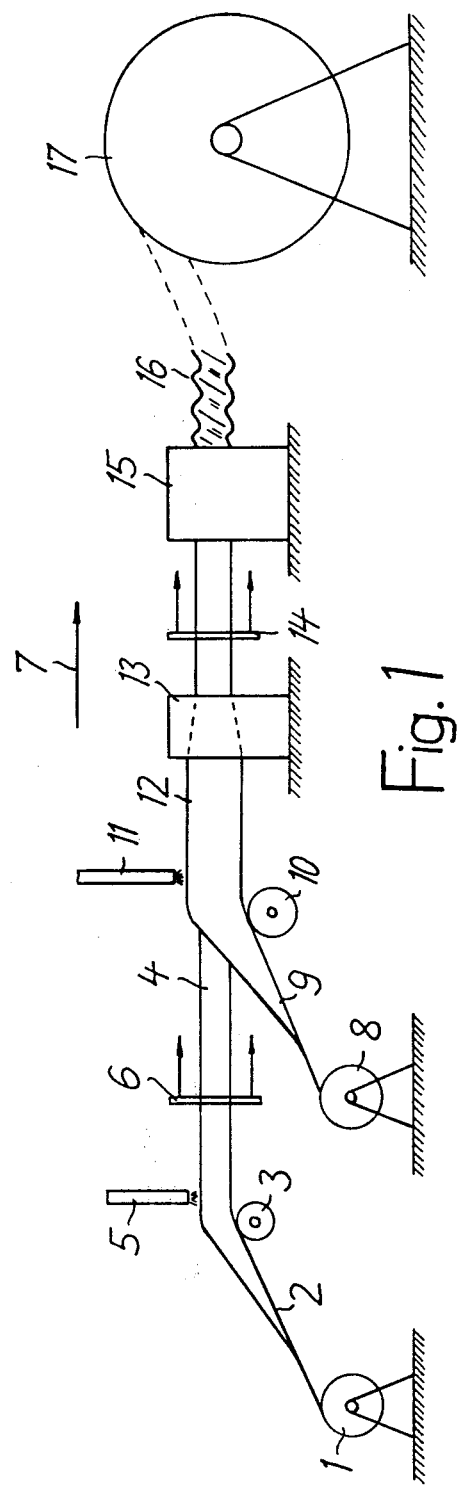

PROCESS FOR MANUFACTURING FLEXIBLE TUBING CAPABLE OF WITHSTANDING SUBSTANTIAL PRESSURES AND FLEXIBLE METAL TUBING MADE THEREBY

BACKGROUND OF INVENTION

This invention relates to techniques for the manufacturing of flexible metal tubing capable of withstanding substantial pressures and the metal tubing made thereby and more particularly to a process and apparatus for manufacturing metal tubing which comprises a plurality of thin walled layers concentrically formed and subsequently corrugated.

Metal tubing capable of withstanding substantial pressures is required for applications involving the direct transportation of liquid and gaseous media as well as the sheathing of electric cabling or heat insulated coaxial conductors. Furthermore, since gaseous pressurized insulating media are frequently employed in electric cabling and heat insulated coaxial conductors to provide appropriate insulation, the tubing employed in the formation of such cabling or conductors is frequently exposed to considerable pressure as generated both from internal and external sources which must be withstood for the appropriate maintenance of acceptable operational characteristics. For instance, in deep sea drilling or well logging applications presently taking place, metal sheathed power cabling is frequently employed and the metal tubing relied upon to form the metal sheath must be able to withstand the substantial ambient pressure loads which manifest themselves during such applications. For instance, at depths of 4,000 meters, the metal tubes employed to sheath power cabling must be able to withstand pressures in excess of 400 atmospheres.

Conventional techniques for the manufacture of metal tubing capable of withstanding pressures of the type encountered in deep sea drilling applications and the like, as aforesaid, are disclosed for instance, in German DT-OS2 019 362. However, the resulting plain tubing set forth therein is highly specialized in nature and can only be formed in relatively short lengths because of its rigidity. Thus, in use, tubing of this nature is both expensive and time-consuming to employ because a large number of specialized fittings are required to join adjacent sections together into a resulting configuration which is capable of withstanding substantial pressures. Furthermore, if plain metal tubing whose wall thickness has been built up to withstand anticipated pressures is considered, it will be appreciated by those of ordinary skill in the art that the same is rigid in nature and may not be corrugated by conventional techniques as known forms of corrugator discs cannot withstand the pressure loads generated by such thick walled tubes. Thus even with plain tubing purposely thickened to withstand high pressure loads, flexibility is not a readily available characteristic and hence the manufacturing thereof in continuous lengths is generally precluded.

The instant invention proceeds from the dual discovery that concentrically formed thin walled metal tubes are capable of withstanding pressures equal to or greater than those withstood by individual thick walled metal tubes and that such concentrically formed thin walled metal tubes may be corrugated by substantially the same corrugation techniques employed for the corrugation of a single thin walled metal tube or sheath when the concentrically arranged tubes are formed in accordance with the teachings of the instant invention. The resulting corrugated structure may be manufactured on a continuous basis and hence, the length of the continuously formed metal tubing manufactured in accordance with the teachings of the instant invention is only limited by the amount of corrugated metal tubing which may be wound on one or more take-up reels. Furthermore, the flexible metal tubing formed in accordance with the teachings of the instant invention completely avoids the rigidity and multitudinous couplings and transitions associated with the use of thick walled tubing previously thought to be necessary for high pressure applications by the use of a plurality of concentrically formed thin walled tubes, while relying upon corrugation techniques which have been previously utilized to enhance the flexibility of cable and the like but only under such conditions where thin walled single element metal tubes were employed. Accordingly, the novel manufacturing techniques taught by the instant invention yield a resulting structure which is flexible and available in continuous lengths. This is achieved by certain manufacturing techniques usually employed to accomplish the cost reduction associated with the use of thin walled structures, while overcoming a previously thought to exist, art recognized limitation in the use of corrugation techniques to singular thin walled structures.

Therefore it is a principle object of the instant invention to provide a process and apparatus for manufacturing flexible metal tubing in extended lengths which is capable of withstanding substantial pressures as well as the metal tubing made thereby. Other objects and advantages of the present invention will become clear from the following detailed description of an exemplary embodiment thereof, and the novel features will be particularly pointed out in conjunction with the claims appended hereto.

In accordance with the teachings of the instant invention, manufacturing techniques for the formation of extended lengths of flexible metal tubing capable of withstanding substantial pressures are provided wherein a plurality of metal tubes are concentrically formed one about the other; each metal tube formed, after the first, is immediately drawn down to a desired diameter so that a resultant structure comprising a plurality of thin walled concentrically formed tubes is achieved; after all of the tubes in the desired structure have been formed, the resultant structure is corrugated in a transverse-axial direction to render the resultant structure formed flexible. Thus, the flexible metal tubes made in accordance with the teachings of the instant invention may be wound on take-up reels and hence produced according to continuous or endless manufacturing techniques to thus avoid the multitudinous couplings and transitions required by high pressure, rigid cable heretofore available in the prior art.

The invention will be more clearly understood by reference to the following detailed description of an exemplary embodiment thereof, in conjunction with the accompanying drawings in which:

FIG. 1 schematically illustrates an exemplary embodiment for the manufacture of extended lengths of flexible metal tubing capable of withstanding substantial pressures in accordance with the teachings of the instant invention;

FIG. 2 is a longitudinal section through one form of flexible metal tubing manufactured in accordance with the techniques of the instant invention;

FIG. 3 is a cross section of electric cabling manufactured in accordance with the teachings of the instant invention; and FIG. 4 shows a cross section of a heat insulated conductor manufactured in accordance with the teachings of the instant invention.

Referring now to the drawings and more particularly to FIG. 1 thereof, there is schematically shown an exemplary embodiment according to the instant invention for manufacturing flexible cable in extended lengths which cable is capable of withstanding substantial pressure. The equipments illustrated in FIG. 1 comprise first and second supply rolls 1 and 8 upon which flat metal material in the form of bands 2 and 9 are wound, shaping stations 3 and 10 each comprising shaping elements, not shown, capable of progressively forming the metallic material into a tubular configuration in a lengthwise direction, welding stations 5 and 11, transport stations 6 and 14, a reduction station 13, a corrugation station 15, and a take-up reel 17 upon which the corrugated cable formed may be wound. As illustrated in FIG. 1, the exemplary process for the formation of extended lengths of flexible cable capable of withstanding substantial pressures initially functions to form an inner tube 4. The inner tube 4 is formed through the continuous processing techniques illustrated in FIG. 1 by the removal of the metal band material 2 wound on the first supply roll 1 and the shaping of the same into a tubular configuration at the shaping station 3. The shaping station 3 may employ, as illustrated, conventional roller deformation techniques so that the metal band 2 is deformed into a tube configuration having adjoining edges disposed in an appropriate position for subsequent welding. The thin walled tube as thus formed at the shaping station 3 is then passed through the welding station 5 wherein adjoining edges of the tube are welded together. Thereafter, the finished inner tube 4 is displaced through the operation of known transport mechanisms, not shown, of the transport station 6 in the direction indicated by the arrow 7.

At a point subsequent to the transport station 6, a second thin walled tube is concentrically formed about the initially formed tube 4. This is achieved in the same manner employed in the formation of the inner thin walled tube 4. More particularly, a metal band 9 is pulled from the second supply roll and deformed into a tubular configuration by shaping station 10 which again may employ conventional deformation techniques so that a second tube is formed about the inner tube 4. After the tube configuration is established, this tube is welded at the welding station 11 so that a pair of concentrically formed tubes are formed using continuous processing techniques. The second tube 12, as initially formed is dimensioned larger than the inner tube 4 to facilitate welding. Therefore, immediately subsequent to the processing carried out at the welding station 11, the diameter of the second tube is reduced, through conventional drawing techniques or the like at the reduction station 13. Thereafter, both tubes are further displaced in the direction indicated by the arrow 7 by the transport station 14 which acts, in this case, to guide the composite tubular structure formed into the corrugating station 15 at which stage both component tubes are provided with a common transverse corrugation. The reduction station 13 should be closely positioned with respect to the welding station 11 so that the reduction in the diameter of the outer tube 12 is quickly achieved subsequent to the formation thereof.

The conventional corrugating station 15 acts to provide both tubes with a common corrugation run in a transverse axial direction as shown in FIG. 2 so that a dual walled, corrugated metal tube 16 is formed and may subsequently be wound on the take-up reel 17, the capacity of which may be considered to control the continuous length of the tubing formed although a plurality of commonly connected reels may be instead employed to further increase the lengths of continuous tubing which may be manufactured. If required, an extruder may be positioned subsequent to the corrugating station 15 to apply a plastic coating such as polyvinylchloride to the outer portion of the tubing formed. A possible alternative however, is to employ limited or corrosion proof type metals for the component tube 12 which would thereby eliminate any need for a plastic coating requirement. To prevent intercorrosion between individual component lengths of the finished tubing formed, provisions would be preferably made for corrosion proofing the surface of each tube formed and/or the ends of each component tube to be joined to a subsequent section.

A surprising aspect of the instant invention lies in the discovery that a tubing configuration including several concentrically disposed thin walled tubes which are, within limits, mutually displaceable, will corrugate in the same manner as a single walled tube whose thickness is acceptable to standard corrugator discs. Furthermore, it has been found that the flexibility of the resulting corrugated structure formed will approximate that of individual corrugated tube members. These results are highly significant, as it will be appreciated by those of ordinary skill in the art, that one of the well known prior art techniques for enhancing the ability of tubing to withstand substantial pressure loads was simply to increase the wall thickness of the tube formed. However, when dealing with extremely high pressure resistant prerequisites, substantial additional deformation work was necessary in the shaping of tubes formed from single metal bands having substantial thickness and, as is well known to those of ordinary skill in the art, such substantial wall thicknesses would virtually preclude a product having substantial flexibility. In addition, the corrugation of tubular members whose wall thickness exceeds 1 mm. is exceedingly difficult as known corrugator discs cannot withstand pressure loads experienced when attempting to corrugate tubes of this type. Thus, the instant invention yields the two fold benefit that the shaping necessary in the formation of the combination of individual thin walled tubular components does not exceed that normally attaching to the formation of the single thin walled tubular members which are incapable of withstanding substantial pressure loads, while the resulting combination structure is capable of withstanding substantial pressure loads and may be corrugated through the same techniques utilized to corrugate individual thin walled structures.

The compressibility rating of the resultant flexible metal tubing 16 formed in accordance with the teachings of the instant invention, is a function of the tubings total wall thickness and, as such, the thickness of each of the individual component tubes. Therefore, as will be readily appreciated by those of ordinary skill in the art, the number and thickness of each of the component tubes employed to form the resulting structure may vary accordingly to meet particular requirements.

Although only a two component tube structure has been illustrated in FIG. 1, it will be appreciated by those of ordinary skill in the art, that additional component tubes would be formed in precisely the same manner illustrated for the component tube 12 by the insertion of additional tube forming component stages, such as that described in conjunction with outer tube 12, subsequent to the transport station 14. Thus, additional tube forming stages may be accommodated by employing the continuous processing techniques according to the instant invention without a substantial increase in the space required for single operating stages. A cross section of the tube structure formed by the exemplary processing techniques according to the instant invention as detailed in conjunction with FIG. 1, is illustrated, partially in cross section, in FIG. 2 and it will be apparent upon a review of FIG. 2 that the resulting tubular structure exhibits a flexible characteristic and hence may be made according to the continuous processing operations described.

Although the flexible metal tubing illustrated in FIG. 1 is most suitable for fluid piping applications, protective sheathing or outer conductors for other forms of cabling may be made through similar techniques. For instance, referring to FIG. 3, there is shown flexible metal tubing suitable in forming protective sheathing or the outer conductor 18 on electrical cabling the core of which has been indicated by the reference numeral 19. In this case, no modification in the mode of forming the metal tubing assembly is necessary except that the diameter of the initial component is first reduced to snugly fit about the inner tube component, and then the combination of such components is corrugated in such a manner as to engage the outer surface of the core. FIG. 4 illustrates an application of the metal tubing formed in accordance with the teachings of the instant invention, for heat insulated conductors and the like. Thus, turning to FIG. 4, it will be seen that an inner tube 20 and a concentrically formed outer tube 21, both of which have been formed in accordance with the teachings of the instant invention, have a heat insulating layer 22 interposed therebetween. Of course, as will also be appreciated by those of ordinary skill in the art, an alternate embodiment would be to manufacture cable of this type in such manner that only one of the inner 20 or outer 22 tubes are formed according to the multiwall manufacturing techniques described above while the other tube is formed in accordance with conventional techniques associated with singular wall tubes.

A comparison of the pressure handling ability of multiwall tubes formed in accordance with the instant invention and those conventionally manufactured according to thick, single wall techniques, resulted in the following comparisons which are set forth herein by way of example. A 25 mm. diameter corrugated tube having a wall thickness of .5 mm. accepted a pressure load in excess of 180 atmospheres prior to buckling. This wall thickness was subsequently reinforced to .8 mm. and resulted in a boosting of buckling strength to 250 atmospheres. A 1.0 mm. wall thickness rated tubing specimen could not be corrugated and hence, as will be appreciated by those of ordinary skill in the art, flexible tubing of solid wall design was limited in possible buckling pressure resistance to values below 250 atmospheres. On the other hand, a two tube component structure made in accordance with the teachings of the instant invention, was formed in such manner that each tube had a wall thickness of .5 mm. and was then corrugated. When tested, the onset of buckling did not occur until 360 atmospheres. Additional boosts in buckling pressure resistance could also be obtained by increasing the wall thickness of each component tube employed or by increasing the number of component tubes relied upon in the resulting configuration. Thus it will be appreciated by those of ordinary skill in the art that the manufacturing techniques according to the instant invention result in an ability to manufacture extensive lengths of flexible cable which can withstand substantial pressures while the manufacturing techniques employed do not require highly sophisticated forming or corrugating apparatus, but merely a multiplication of conventional equipments so that a multiwalled structure is formed in the particular manner required by the instant invention.

While the invention has been described in conjunction with a single exemplary embodiment thereof, it will be understood that many modifications will be readily apparent to those of ordinary skill in the art; and that this application is intended to cover any adaptations or variations thereof. Therefore, it is manifestly intended that this invention be limited only by the claims and the equivalents thereof.

What is claimed is:

1. A process for manufacturing metal tubing formed of a plurality of tubular members and capable of withstanding substantial pressures, comprising the steps of:
    deforming a first metal band in a longitudinal direction into a first tubular member;
    continuously welding the longitudinal edges of said first tubular member to form a first tubular member having a longitudinally welded seam;
    deforming at least a second metal band in a longitudinal direction concentrically about said first tubular member and into a second tubular member;
    continuously welding the longitudinal edges of said second tubular member to form a second tubular member having a longitudinally welded seam;
    reducing the diameter of said second tubular member to form metal tubing formed of a plurality of tubular members; and
    corrugating said metal tubing formed in a transverse axial direction.

2. The process according to claim 1 additionally comprising the step of applying a corrosion proof coating to each tubular member prior to the formation of a succeeding tubular member thereabout.

3. The process according to claim 1 additionally comprising the step of forming a plastic sheathing about the metal tubing formed.

4. The process according to claim 1 wherein said step of reducing is accomplished by drawing down said second tubular member.

5. The process according to claim 4 additionally comprising the step of applying a corrosion proof coating to each tubular member prior to the formation of a succeeding tubular member thereabout.

6. The process according to claim 4 additionally comprising the step of forming a plastic sheathing about the metal tubing formed.

7. The process according to claim 5 additionally comprising the step of forming a plastic sheathing about the metal tubing formed.

8. The process according to claim 1 wherein said first tubular member is formed concentrically about a heat insulated conductor to form heat insulated coaxial cable additionally comprising the step of reducing the diameter of said first tubular member about said heat insulated conductor prior to deforming said second metal band.

9. The process according to claim 1 wherein said first metal band and said second metal band are comprised of different metals.

10. The process according to claim 1 wherein said first tubular member is formed concentrically about but separated from an electrical cable to form cabling suitable for electrical application, said second tubular member being formed about said first tubular member and being reduced in diameter to snugly fit about the first tubular member prior to said corrugating step, said corrugating step reducing said metal tubing comprising said first and second tubular members so as to reduce the inner diameter of the tubing so as to first engage the outer surface of said electrical cable.

11. Metal tubing comprising:
a first corrugated tubular member having a longitudinal welded seam; and
a second corrugated tubular member having a longitudinal welded seam, said second corrugated tubular member being concentrically disposed about said first corrugated tubular member, said first and second corrugated tubular members being formed in accordance with the process of claim 1.

12. The metal tubing according to claim 11 wherein said metal tubing is flexible and an interstice is provided between said first and second corrugated tubular members.

13. The metal tubing according to claim 11 wherein said metal tubing is flexible and said first and second corrugated tubular members are formed of different metals.

14. The metal tubing according to claim 11 additionally comprising a heat insulated conductor disposed within said first corrugated tubular member, said first tubular member being initially formed about said heat insulated conductor and reduced in diameter thereabout prior to forming said second tubular member and prior to a corrugation of said first and second tubular members.

* * * * *